(No Model.)
J. H. ALEXANDER.
HEATING UTENSIL.
No. 605,571. Patented June 14, 1898.
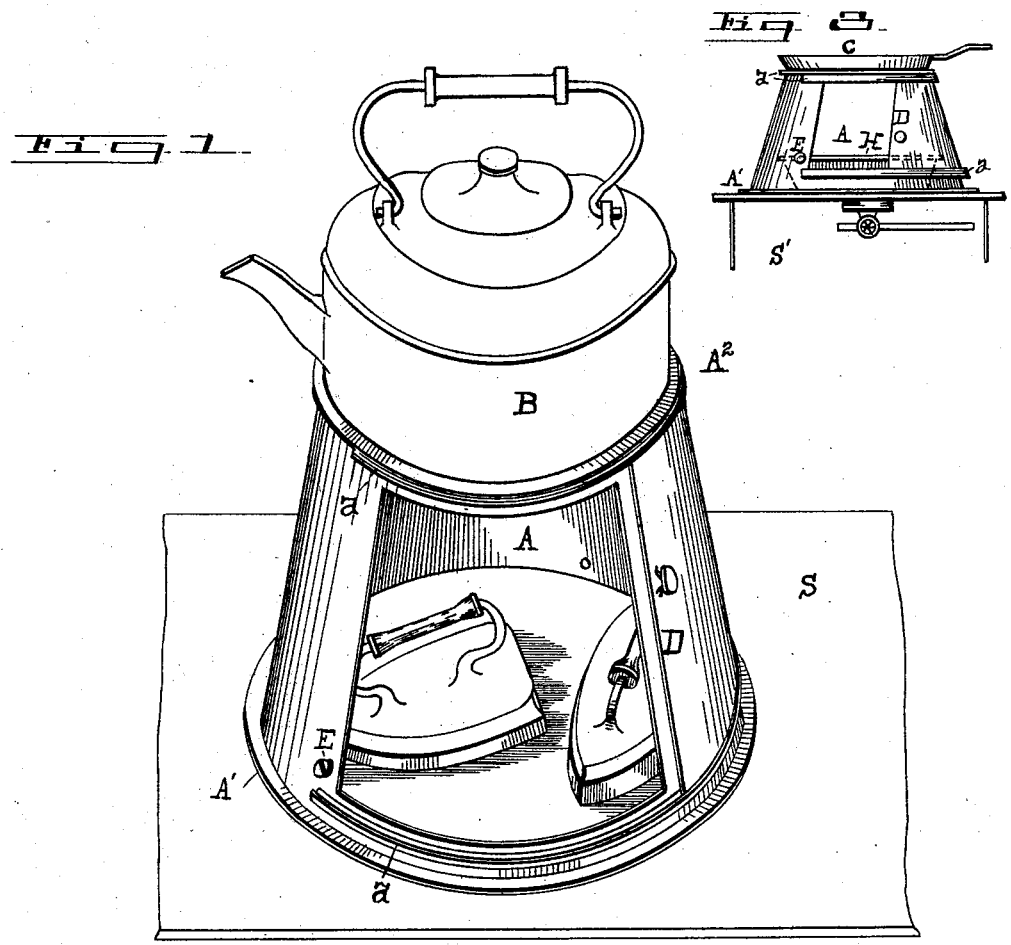
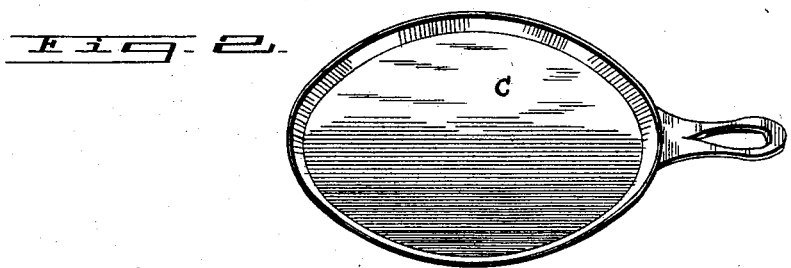
WITNESSES
Chas. K. Davies.
J. C. Van Deventer
INVENTOR
J. H. Alexander
By W. A. Bartlett
Attorney.

UNITED STATES PATENT OFFICE.

JULIA H. ALEXANDER, OF LOUISVILLE, KENTUCKY.

HEATING UTENSIL.

SPECIFICATION forming part of Letters Patent No. 605,571, dated June 14, 1898.

Application filed August 3, 1897. Serial No. 646,891. (No model.)

*To all whom it may concern:*

Be it known that I, JULIA H. ALEXANDER, residing at Louisville, in the county of Jefferson and State of Kentucky, have invented certain new and useful Improvements in Heating Utensils, of which the following is a specification, reference being had therein to the accompanying drawings.

This invention relates to utensils for applying heat from one source of supply to a plurality of subjects in the kitchen or laundry.

The object of the invention is to produce a simple and compact utensil for the purpose of economizing heat and improving the utensils of the kitchen.

Figure 1 is a perspective view of the heater applied to the top of a stove and showing a tea-kettle on top of the heater and a pair of sad-irons within the heater. Fig. 2 is a perspective view of a griddle which may be applied as a cover to the heater in lieu of the tea-kettle. Fig. 3 is a diagrammatic elevation, on reduced scale, showing heater applied to an oil or vapor stove with cooking vessel inside and griddle on top, door partly closed.

A indicates the body of the heater. The heater-body is in the form of a frustum of a cone and is open at top and bottom. Preferably the body is of cast or sheet metal, but may be lined with a non-conducting material or compound. The base is turned out at the bottom, as at A', and the top rim is turned in at A², leaving a round opening like the griddle-hole of a stove. This hole at the top of the casing can be closed by a tea-kettle B or by a griddle C or by any one of many cooking utensils common in the kitchen.

The side of the frusto-conical vessel A has an opening, and guide-ribs *a a*, outside said body and above and below the opening, serve to support and guide the door D. The guide-ribs are continued beyond the opening at one side, so that the door D may be moved circumferentially in said guide-ribs and may be opened and closed, as usual with sliding doors. A stop E, which may be a screw or other suitable abutment, may be applied after the door is in place to prevent the escape of the door. Any suitable stop at the end of the guideway will serve to check the movement of the door in either direction.

The heater may be placed on top of a stove or furnace of any suitable kind, a section of such a stove-top being indicated at S, Fig. 1. In such case sad-irons or other utensils may be placed within the heater and the door closed, and the heat from the stove will be prevented from escaping by the heater A and will at the same time be guided to the kettle B or other cooking vessel with which the top of the heater may be closed.

In Fig. 3 the device is supposed to rest on the top of the stove S', which may be a vapor, oil, or gas stove. The baking-pan H within the heater indicates that one form of cooking vessel may be used within the heater, while another kind C is used to cover the top of such heater.

The frusto-conical form of heater insures solidity when the device is turned with its smaller end upward. The sliding door occupies almost no space and moves easily about the heater-body. On occasion the heater may be inverted and will thus form a supporting-base for a very large cooking vessel, and the reversible feature of the heater enables it to be applied to stove-holes of different sizes.

What I claim is—

The reversible heater, consisting of a frusto-conical metallic shell, open at top and bottom, and provided with a side door, whereby the heater is adapted for use with different-sized cooking utensils, and on a stove-top or on griddle-holes of different sizes, all substantially as described.

In testimony whereof I affix my signature in presence of two witnesses.

JULIA H. ALEXANDER.

Witnesses:
 DON ALEXANDER,
 O. E. LOWRY.